US006907091B2

(12) United States Patent
Lee (10) Patent No.: US 6,907,091 B2
(45) Date of Patent: Jun. 14, 2005

(54) SEGMENTED ARCHITECTURE FOR MULTIPLE SEQUENCE DETECTION AND IDENTIFICATION WITH FREQUENCY OFFSET COMPENSATION

(75) Inventor: Jung Ah Lee, Pittstown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 832 days.

(21) Appl. No.: 09/773,176

(22) Filed: Jan. 31, 2001

(65) Prior Publication Data

US 2002/0136333 A1 Sep. 26, 2002

(51) Int. Cl.[7] .......................... H04L 27/06; H04B 7/216
(52) U.S. Cl. ...................................... 375/343; 375/150
(58) Field of Search ........................ 375/130, 140–143, 375/146, 150, 324, 343, 354, 152, 340; 455/437; 708/314, 422, 426

(56) References Cited

U.S. PATENT DOCUMENTS 5,426,665 A * 6/1995 Cleverly et al. ............ 375/150
6,233,271 B1 * 5/2001 Jones et al. ................. 375/142
6,654,432 B1 * 11/2003 O'Shea et al. .............. 375/354

* cited by examiner

*Primary Examiner*—Young T. Tse
*Assistant Examiner*—Edith Chang
(74) *Attorney, Agent, or Firm*—Christopher N. Malvone; Stephen M. Gurey (57) ABSTRACT

Detection and identification of known sequences such as sequences composed of Walsh-Hadamard sequence and scrambling sequence are provided in a fast fading and frequency offset environment using a segmented correlator and FHT (Fast Hadamard Transform) architecture with frequency offset compensation. The incoming sequence of samples or data is segmented into blocks. Each block is individually detected using a correlator/FHT segment. Each sequence identifying output of each correlator/FHT segment is multiplied by a sinusoid for frequency offset compensation. The frequency offset compensated output from each correlator/FHT segment is summed with the corresponding frequency offset compensated output of other correlator/FHT segments. Each sum is compared with a threshold to determine whether a particular sequence has been detected and identified.

4 Claims, 6 Drawing Sheets

SEGMENTED ARCHITECTURE FOR MULTIPLE SEQUENCE DETECTION AND IDENTIFICATION WITH FREQUENCY OFFSET COMPENSATION

RELATED APPLICATION

Related subject matter is disclosed in the following applications assigned to the same Assignee hereof: U.S. patent application entitled "Segmented Correlator Architecture For Signal Detection In Fading Channels", Ser. No. 09/665,511, filed Sep. 9, 2000 now abandoned; and U.S. patent application entitled "Segmented Architecture For Multiple Sequence Detection And Identification In Fading Channels", Ser. No. 09/664,646, filed Sep. 19, 2000 now U.S. Pat. No. 6,771,688.

BACKGROUND OF THE INVENTION

1. Field of the Invention

The present invention relates to communications; more specifically, wireless communications.

2. Description of the Related Art

Wireless communications involve creating a voice or data communication channel between a mobile communication station and a base station. Setting up the communication channel typically involves the mobile station transmitting a known sequence on an access channel that is monitored by the base station. The base station detects the known sequence and uses it for functions such as estimating a timing difference between the mobile station and base station.

Figure 1:
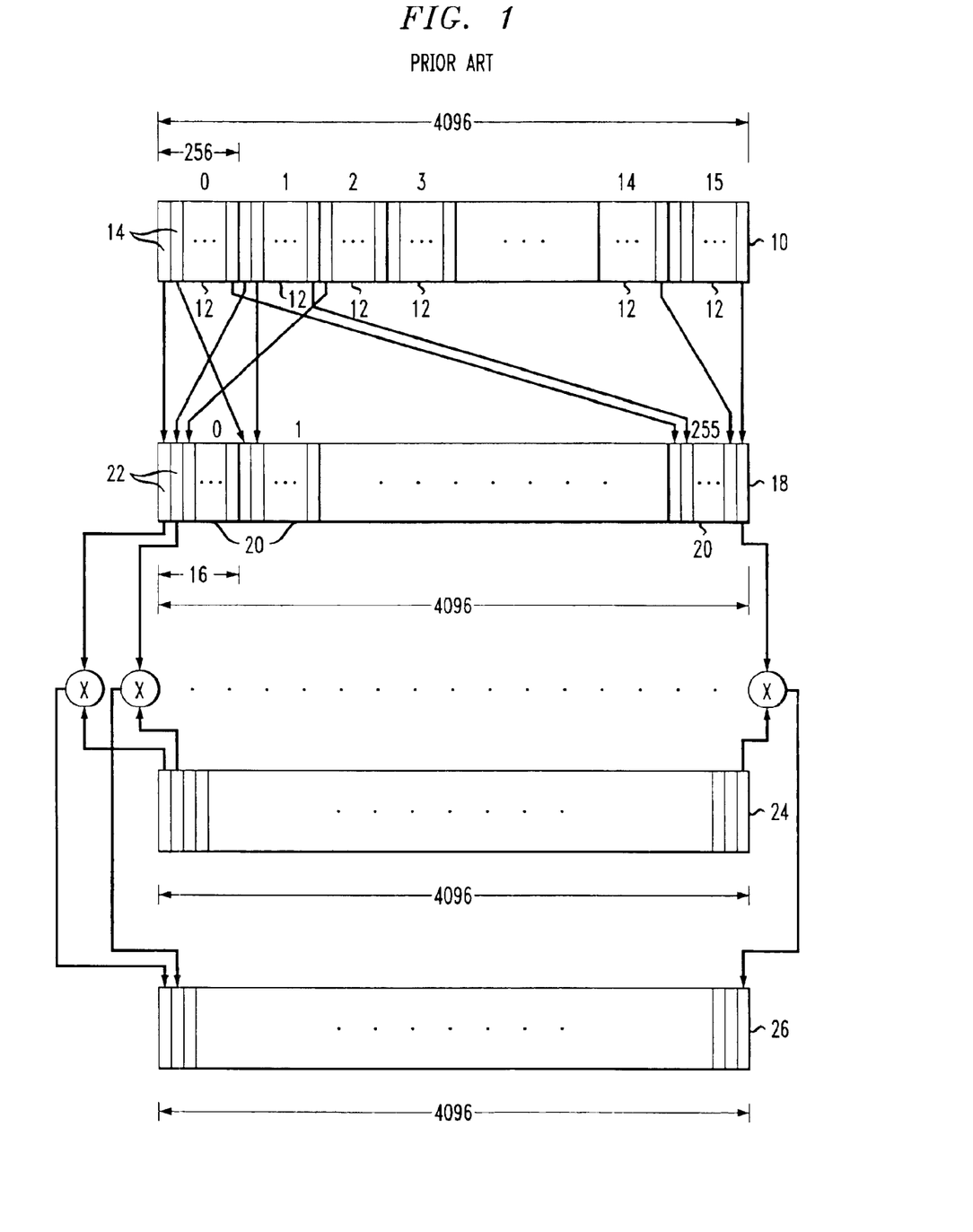
FIG. 1 illustrates how a signature sequence is used to generate a transmit sequence that is transmitted from a mobile station to a base station.

The signal transmitted by the mobile station to the base station over an access channel typically includes a known sequence based on one of M possible signature sequences comprising S symbols. In one such system, M=16 different signature sequences are available, where each signature sequence comprises S=16 symbols. UMTS W-CDMA uses length 16 Walsh-Hadamard sequences as signature sequences. These sequences are well known in the art and are described on pages 15–16 of 3GPP TSG RAN "Spreading and Modulation (FDD)," TS25.213 V3.2.b. Once one of the 16 symbol signature sequences is selected, it is used to generate a sequence that is transmitted to the base station. FIG. 1 illustrates how the transmit sequence is generated from a 16 symbol signature sequence. Sequence 10 represents a 16 symbol signature sequence with symbol periods 12, where each symbol is +1 or −1. Each of the 16 symbol periods is divided into C chip or sample periods 14, in this example C=256. As a result, the signature sequence comprises a total of K chip or sample periods, where K=4,096 (S=16 symbol periods×C=256 chip periods per symbol period). The signature sequence is used to generate interleaved sequence 18. The interleaved sequence comprises 256 (K/C) repeating periods 20, each with 16 (S) chip periods 22 for a total of 4,096 (K) chip periods. The interleaved sequence is created by using the symbol values in the first chip period of symbol periods 0 through 15 of signature sequence 10 to populate the first 16 chip periods of repeating period 0 of interleaved sequence 18. The chip periods of repeating period 1 of interleaved sequence 18 are populated using the symbol values in the second chip periods of each of the 16 symbol periods of signature sequence 10. Similarly, the chip periods of repeating period 2 of interleaved sequence 18 are populated using the symbol values in the third chip periods of symbol periods 0 through 15 of signature sequence 10. This process continues until the 16 chip periods of the last repeating period (repeating period 255) are populated using the symbol values in the last chip period of each of the 16 symbol periods of signature sequence 10. As a result, interleaved sequence 18 consists of 256 repeating periods each containing 16 chip periods. Each of the repeating periods contains 16 chip periods having values equal to the value of one chip period from each symbol period of signature sequence 10. Therefore, a sample of symbol periods 0 through 15 of signature sequence 10 is contained in chips 0 through 15, respectively, of each repeating period of interleaved sequence 18.

The final step in generating a known sequence that is transmitted from the mobile station to the base station involves performing a chip period by chip period multiplication of interleaved sequence 18 with a 4,096 (K) chip period binary sequence 24. Binary sequence 24 is known and assigned to the particular base station with which the mobile will communicate. The result of the chip period by chip period multiplication is transmit sequence 26 which is then transmitted by the mobile to the base station.

The set of possible transmit sequences 26 is known by the base station that will receive the mobile transmission. The available signature sequences, the binary sequence and the interleave pattern are known, and as a result, the set of possible transmit sequences 26 is also known for each of the available signature sequences.

Figure 2:
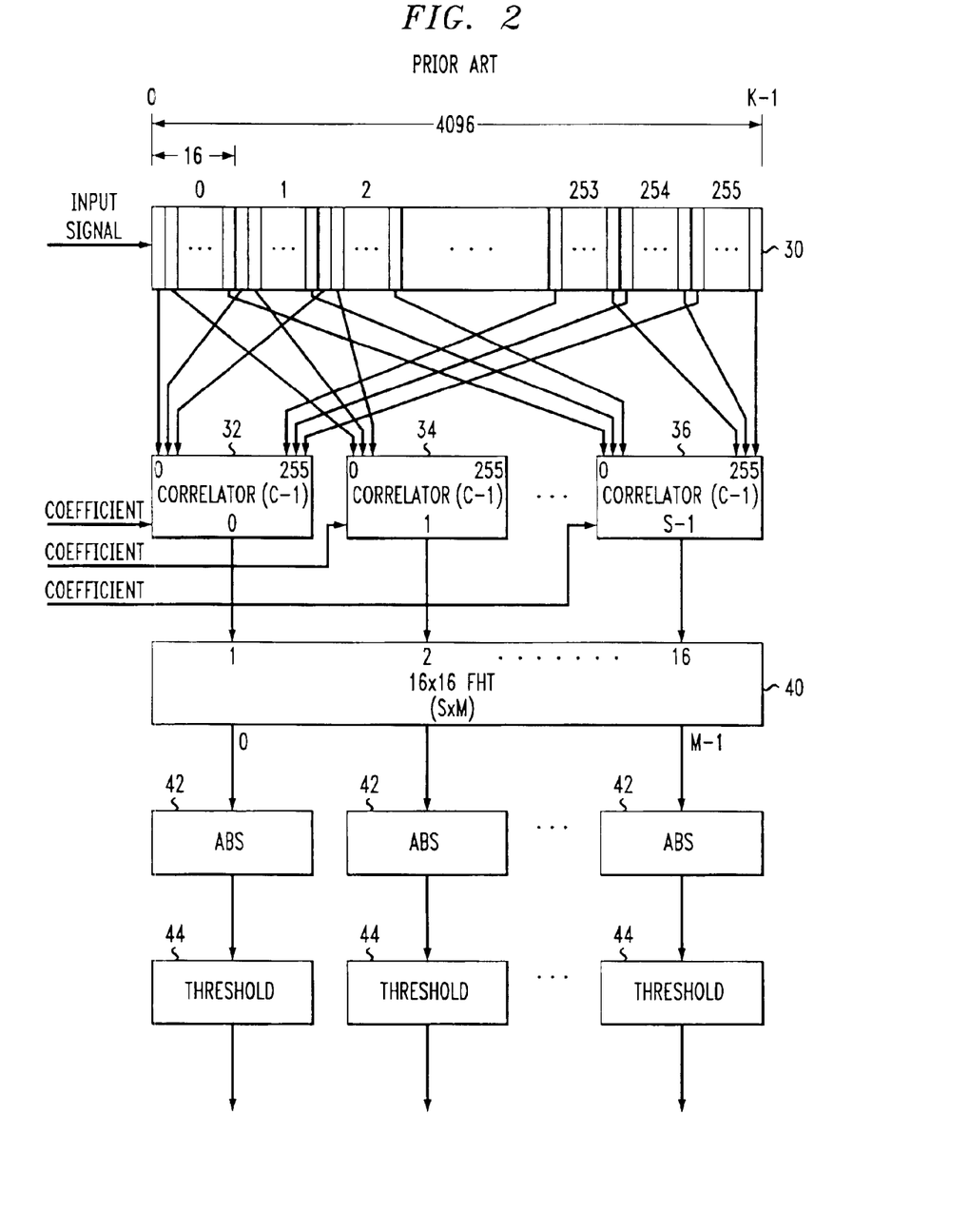
FIG. 2 illustrates a prior art signal detector and identifier.

FIG. 2 illustrates a multiple signal detector used by the base station to identify and detect known sequences transmitted by a mobile station and received at the base station. Shift register 30 receives samples of the received sequence. Shift register 30 has 4,096 (K) locations in order to provide for 4,096 samples which correspond to the 4,096 chip periods that compose the received sequence. In order to account for the interleaving that was used to create the received sequence, a deinterleaving process is carried out while providing samples from shift register 30 to correlators 32, 34 and 36. It should be noted that the first chip period of each 16 chip long repeating period is provided to correlator 32. Similarly, the second chip period of each 16 chip long repeating period is provided to correlator 34. This process continues for a total of 16 correlators where the $16^{th}$ correlator or correlator 36 receives the last chip of each 16 chip long repeating period. This deinterleaving process provides each correlator with 256 chip period samples of a symbol period. Each of the correlators is provided with coefficients representative of a sequence of values associated with the 256 chip period values that represent a symbol. It should be noted that the sequence of coefficients provided to the correlator take into account the chip period by chip period multiplication that occurred between interleaved sequence 18 and binary sequence 24. The output provided by each correlator indicates how well the 256 chip period values from a symbol period match the sequence of chip period values that are expected for a +1 or −1 symbol. As a result, Fast Hadamard Transform (FHT) 40 receives an input from each of the 16 correlators where each input represents how well the 256 chip period values being examined by the correlator correspond to a symbol and whether that correspondence is to a +1 or −1 symbol.

FHT is well known in the art and are discussed in references such as "Fast transforms: algorithms, analysis, applications," pages 301–329, by D. Elliot and K. Rao, Academic Press, Orlando, Fla., 1982. FHT 40 is provided with coefficients that are used to identify which of 16 possible signature sequences are being received based on the outputs provided by the correlators. The FHT provides 16 outputs each corresponding to one of the possible signature sequences, where the magnitude of the output indicates how well the samples in shift register 30 matches each sequence. FHT 40 outputs are each provided to absolute value generator 42 which takes the absolute value or the square of the absolute value of the output for each FHT output. Each of the outputs of absolute value generator 42 is provided to thresholder 44 which compares the value from absolute value generator 42 with a predetermined threshold. When the value exceeds the threshold, a detection is declared and the received sequence is identified as corresponding to a particular signature sequence by the FHT output that produced the threshold-exceeding signal.

It should be noted that the base station attempts to detect the sequence over a period of time referred to as a search window. A search window is typically N times the sampling period of the received sequence. Once shift register 30 is filled with an initial set of samples, it shifts in new samples and shifts out older samples N-1 times. This results in N attempts to detect the expected sequence over a search window that is equal to N times the time period between samples provided to shift register 30. A detected sequence's position in the search window is determined by the number of shifts made by shift register 30 when one of the FHT's outputs corresponding to a signature pattern to be detected exceeds a threshold. The detected sequence's position in the search window is a measure of the round trip delay between the mobile station and the base station.

When the mobile station is in a fast moving motor vehicle or train, the signal supplied to the shift register is subjected to fast fading and frequency offsets. As a result, the sequence received by the shift register is partially corrupted and produces a low FHT output. As a result, the FHT outputs that are compared with a threshold do not exceed the threshold and thereby result in a failure to detect or identify a received signature sequence.

SUMMARY OF THE INVENTION

The present invention provides detection and identification of known sequences such as sequences composed of Walsh-Hadamard sequence and scrambling sequence in a fast fading and frequency offset environment using a segmented correlator and FHT (Fast Hadamard Transform) architecture with frequency offset compensation. The incoming sequence of samples or data is segmented into blocks. Each block is individually detected using a correlator/FHT segment. Each sequence identifying output of each correlator/FHT segment is multiplied by a sinusoid for frequency offset compensation. The frequency offset compensated output from each correlator/FHT segment is summed with the corresponding frequency offset compensated output of other correlator/FHT segments. Each sum is compared with a threshold to determine whether a particular sequence has been detected and identified.

DETAILED DESCRIPTION OF THE INVENTION

Figure 3:
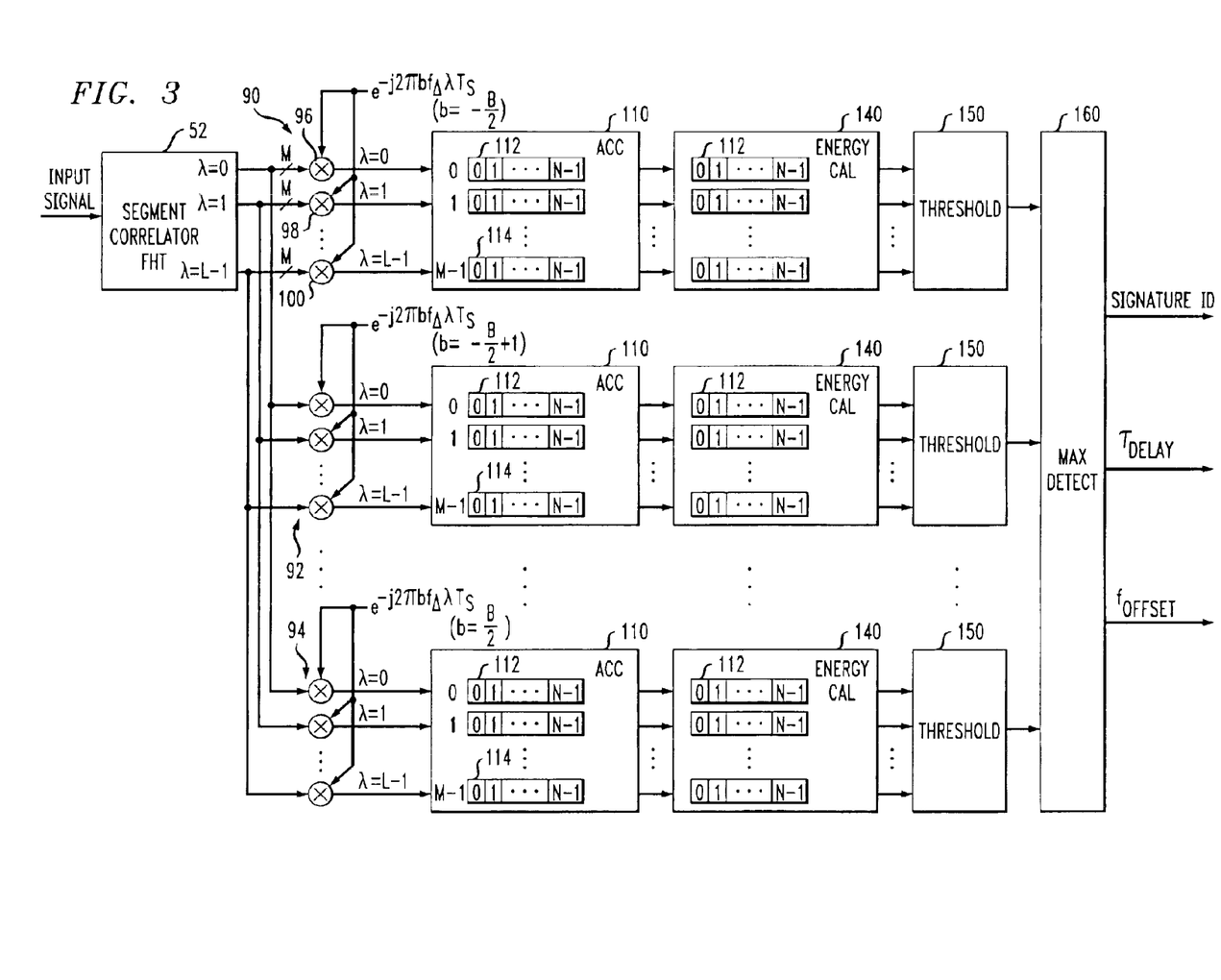
FIG. 3 illustrates a functional block diagram of a segmented sequence detector and identifier with frequency offset compensation.

FIG. 3 illustrates a functional block diagram of a segmented sequence detector and identifier that compensates for frequency offsets. Input signal 50 is received by segmented correlator/FHT 52. Segmented correlator/FHT 52 segments the collection of K input samples from input signal 50 into L segments. Each of the L segments are individually used as inputs to a correlator/FHT combination to detect and identify one of M possible expected sequences (m=0 to M-1). As a result, segmented correlator/FHT 52 produces L sets of M outputs. Each set of M outputs correspond to a separate correlator/FHT pair within segmented correlator/FHT 52. Each output in the set of M outputs is associated with a particular expected sequence and indicates how well the segment of input samples being examined by the particular correlator/FHT pair correspond to a particular expected sequence.

Figure 4:
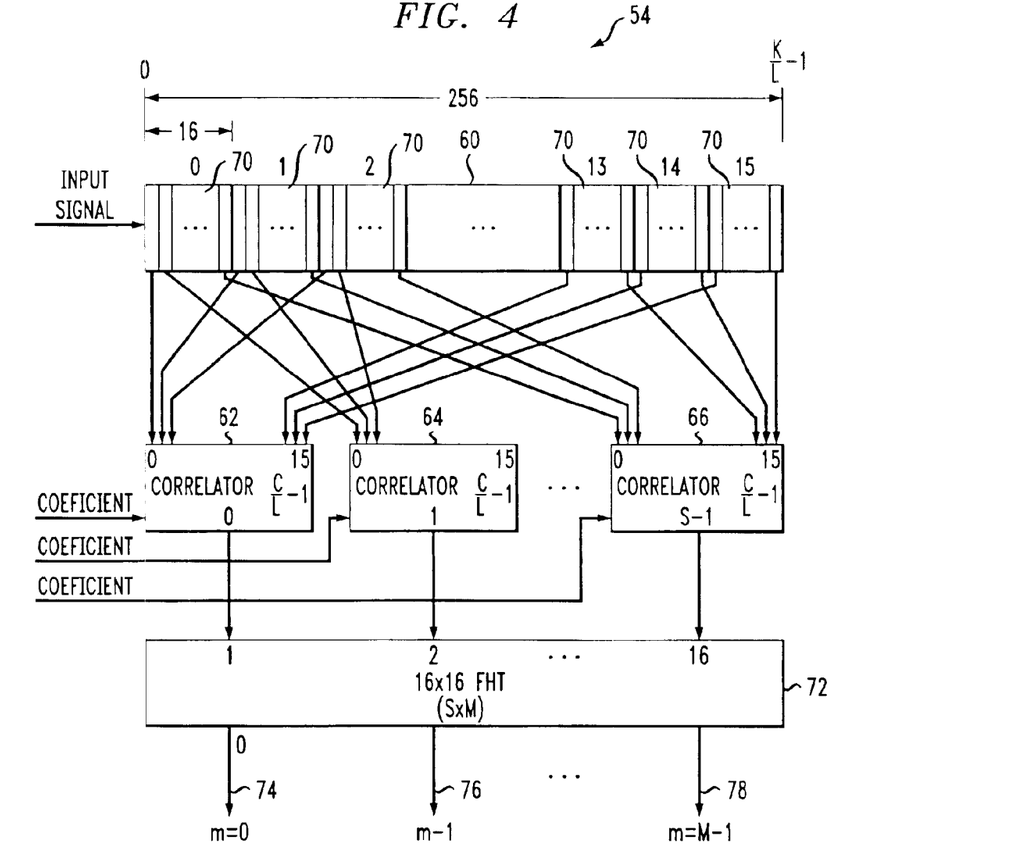
FIG. 4 illustrates a segment of a segmented correlator/FHT.
Figure 5:
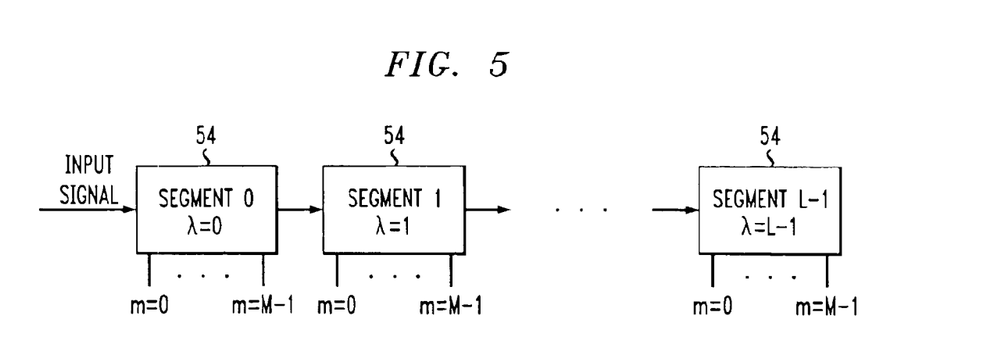
FIG. 5 illustrates an architecture using multiple segmented correlator/FHTs.

FIG. 4 illustrates a functional block diagram of correlator/FHT segment 54 of segmented correlator/FHT 52. In this example, segmented correlator/FHT 52 comprises 16 (L=16) of the segments illustrated in FIG. 3. FIG. 5 illustrates the relationship between the L segments composing segmented correlator/FHT 52. Each of the L segments receives $$\frac{K}{L}$$

samples of the input signal, where K is the number of chip periods or samples composing the sequence. As new samples are shifted into the first segment, the oldest samples are shifted out of the first segment and into the second segment. Similarly, each of the remaining segments receives inputs from the prior segment and shifts out its oldest sample to the next segment.

The detection and identification process begins after an initial set of K samples of the input signal has been received (i.e., each segment has an initial set of $$\frac{K}{L}$$

samples). Returning to FIG. 4, shift register 60 receives the initial or $$\frac{K}{L}$$

(256) samples of the received sequence, where L is the number of segments composing the correlator/FHT segment and where K is the number of chips periods or samples composing the sequence received by a base station from a mobile station. (In this example, K=4096.) Other values of L may be used where larger values of L improve performance in a fast fading environment at the expense of increased hardware and/or processing. The received sequence in shift register 60 is deinterleaved and provided to correlators 62, 64 through 66. The deinterleaving is used to reverse any interleaving that was performed when the sequence was produced by the mobile station. The deinterleaving may be skipped if the transmitted sequence was produced without interleaving. It should be noted that only three correlators are shown, but in this embodiment 16 correlators of length 16 are used. Sixteen correlators are used in this example because it is assumed that the signature sequence contains S=16 symbols. Generally, the number of correlators should match the number of symbols (S) in the sequence to be identified, and the correlators should have a length of $$\frac{C}{L},$$

where C is the number of chip periods per symbol period in the signature sequence. In this example, C=256. Returning to the 16 symbol example, the first period chip value of each 16 chip long repeating period 70 is provided to correlator 62; the second chip period value of each 16 chip long repeating period 70 is provided to correlator 64; and in a similar fashion the remaining correlators are populated with input values until correlator 66 receives the last chip value of each 16 chip long repeating period 70. The coefficients or representative symbols provided to correlators 62, 64 and 66 are a $$\frac{C}{L}$$

(16) chip value sequence that is expected when taking into account the chip period by chip period multiplication between the interleaved sequence and the base station associated binary sequence. Each correlator output indicates how well the $$\frac{C}{L}$$

chip values provided to the correlator correspond to the sequence of chip period values that are expected for a +1 or −1 symbol. The symbol correlation outputs of correlators 62, 64, and 66 are provided to 16×16 (S×M) FHT 72, where S is the number of symbols in a signature sequence and M is the number of different signature sequences that may be received. Based on the outputs from the correlators, FHT 72 provides an output value on each of its 16 (M) signal identity outputs indicating how well the signal represented by the symbol correlation inputs from the correlators correspond to each of 16 (M) possible signature sequences. For example, output 74 indicates how well the sequence in register 60 corresponds to a first signature sequence (m=0). Similarly, output 76 indicates how well the sequence in register 60 corresponds to a second signature sequence (m=1). Finally, output 78 indicates how well the sequence in register 60 corresponds to a sixteenth signature sequence (m=M-1). It should be noted that if M possible signature sequences are to be identified, an M output FHT should be used. Additionally, it is desirable for the number of symbols S to equal M.

The input signal is shifted through segments 54 via input shift registers 60 and examined to attempt detection/identification of the known or expected sequence until a search window of N input signal sample periods has been examined. This is accomplished by examining the initial K samples of the input signal and then examining each of the following N-1 new sets of K samples. A new set of K samples is produced each time shift registers 60 shift in a new input signal sample and shift out the oldest sample. A detected/identified sequence's position in the search window is determined by the number of shifts made by shift registers 60 when a sequence is detected.

The outputs from segmented correlator/FHT 52 are provided to multiplier sets 90, 92 and 94. Each set of multipliers receives a complete set of the outputs from segmented correlator/FHT 52. Each set of multipliers is used to compensate for a different frequency offset affecting the input signal. The frequency offset is examined in terms of frequency bins. The frequency resolution or difference between the bins is frequency $f_\Delta$ which may, for example, be a value such as 200 Hz. The number of bins used to compensate for the frequency offset is equal to B+1 where, for example, B may equal a number such as 4. Each set of multipliers is associated with a different frequency bin or offset frequency and multiplies the signals received from segmented correlator/FHT 52 with a sinusoid represented by $e^{-j2\pi b f_\Delta \lambda T_s}$ where $b \times f_\Delta$ defines the offset frequency, where b=−B/2, −B/2+1, . . . B/2 and where $T_s$ the sampling period of the FHT output signal. With C=256, $T_s$ corresponds to the symbol period of the signal, or a 256 chip period. For example, multipliers 96, 98 and 100 of multiplier set 90 will have a frequency offset correction factor of −B/2×$f_\Delta$. It should be noted that multiplier set 96 receives L groups of M inputs, that is, M outputs from each of the L segments within segmented correlator/FHT 52. Each of the M outputs from each of the L segments is multiplied by a sinusoid that has a frequency that is indexed by the index value λ where the value of λ is based on the segment from which the outputs originate. It should be noted that multiplier 96 simply multiplies by the value 1 since λ=0 for segment 0. Segment 1 (λ=1) is multiplied by the sinusoid that has its frequency indexed by the value 1. Similarly, segment L-1 where λ=L-1 is multiplied by a sinusoid whose frequency is indexed by the value L-1. This results in the separate segments produced by segmented correlator/FHT 52 being multiplied by a different multiple of the frequency offset where (−B/2×$f_\Delta$) is the frequency offset or frequency bin associated with multiplier set 90. This multiplication compensates for a frequency offset in the input signal equal to (−B/2×$f_\Delta$). Since the frequency offset in the input signal is not known, multiplier sets 92 through 94 are each used to compensate for a different frequency offset in the input signal. For example, multiplier set 90 compensates for a frequency offset of −B/$2f_\Delta$, multiplier set 92 compensates for a frequency offset of (−B/2+1)$f_\Delta$, and multiplier set 94 compensates for a frequency offset of B/$2f_\Delta$. This results in the outputs of segmented correlator/FHT 52 receiving different frequency offset compensation for each of the multiplier sets. The multiplier set associated with the frequency offset closest to the actual frequency offset in the input signal will produce an output having larger magnitudes.

The outputs of each multiplier set 90, 92 through 94 are provided to accumulators 110. Each of the accumulators receives L sets of M inputs from the multipliers. The accumulators perform the accumulation of L values for each of the M inputs. For example, for m=0, a sum of the L different m=0 values received from the multipliers is formed and stored. This type of summation and accumulation is carried out for each set of L values for m=0 to m=M-1. This is illustrated by accumulation positions 112 thorough 114, where L values of m=0 are accumulated in position 112 and where L values of m=M-1 are accumulated in position 114.

Figure 6:
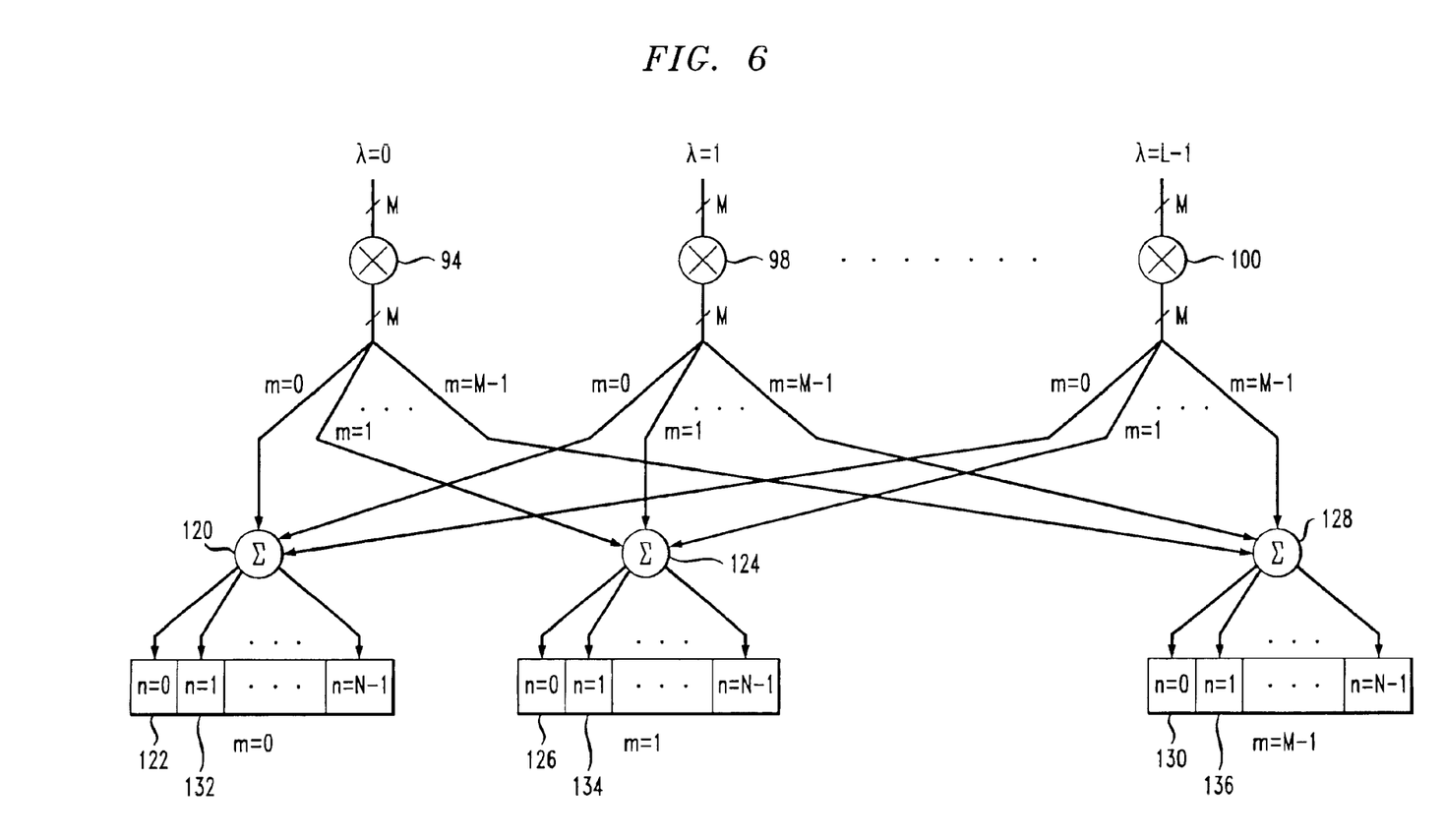
FIG. 6 illustrates accumulations performed using the outputs of frequency offset compensating multipliers.

FIG. 6 illustrates the accumulation process carried out by accumulator 110. Outputs λ=0, λ=1 and λ=L-1, are received from segmented correlator/FHT 52. The outputs of segmented correlator/FHT 52 are multiplied by multipliers 96, 98 and 100 and then passed to accumulator 110. Accumulator 110 forms a separate accumulation for each of the M inputs received from the multipliers. For example, output m=0 for each of the segments λ=0 to λ=L-1 is summed by summer 120 and stored in accumulation 122. Similarly, output m=1 for each of the segments λ=0 to λ=L-1 is summed by summer 124 and stored in accumulation 126. This process continues for each of the M inputs where m=0 to M-1 so that output m=M-1 for each of the segments λ=0 to λ=L-1 is summed by summer 128 and stored in accumulation 130. After accumulations have been created for each of the M inputs, a new sample of the input signals is obtained by shifting a new input sample signal into segmented correlator/FHT 52. This results in a one input signal sample period shift in the N sample period wide search window. As a result of the new input signal sample set, new outputs are produced by multipliers 86 through 100. These new outputs are also accumulated by accumulator 110. Once again, L values of each of the M inputs are accumulated in separate sums. In this case, since the search window has been shifted by one sample period, the separate accumulations are stored in accumulations 132, 134 and 136 for accumulations associated with inputs m=0, m=1, m=M-1, respectively. It should be noted that for each potion in the search window (n=0 to N-1), a separate accumulation is provided for each set of M inputs received by accumulator 110 from the multipliers.

Energy calculators 140 determine an energy content associated with each of the accumulations received from accumulators 110. As a result, each of energy calculators 140 perform M×N energy calculations. The energy calculations are executed by taking either the absolute value or the square of the absolute value of each accumulation received from accumulator 110. Each energy calculation is stored so that it may be identified with a particular expected sequence m and a particular position n in the search window.

Figure 7:
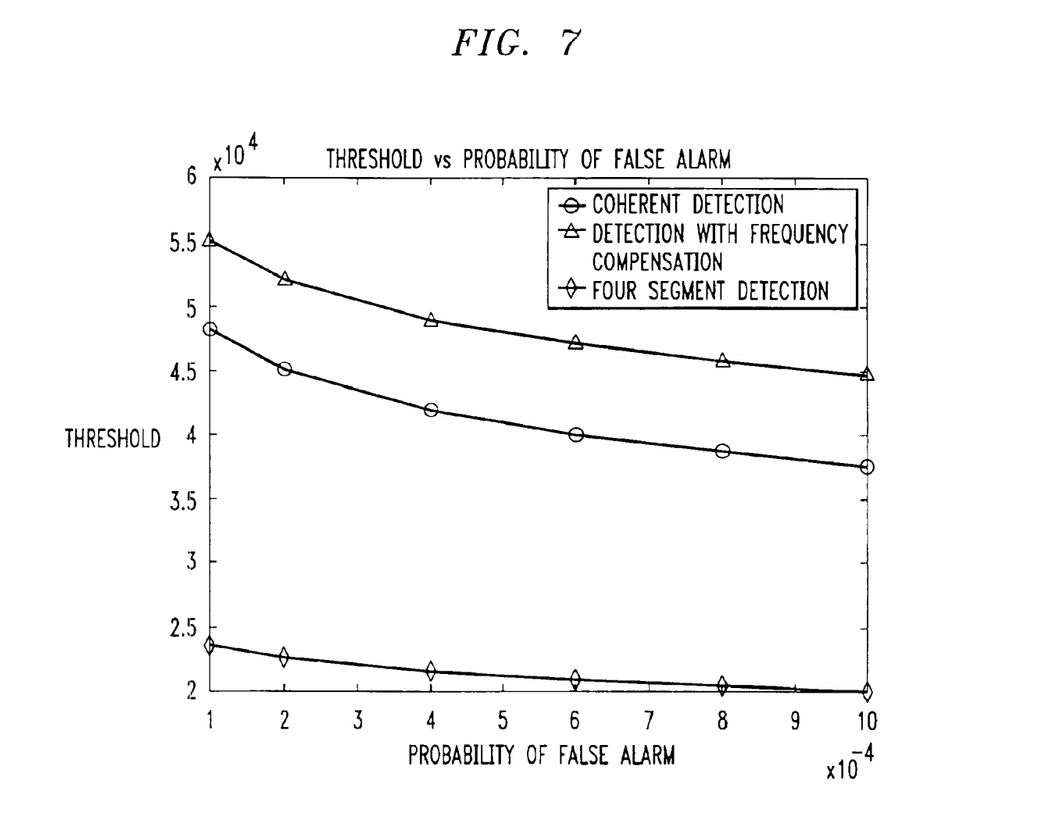
FIG. 7 illustrates threshold values for different probabilities of false alarms.

The output of energy calculation 140 is provided to threshold units 150. Each of threshold unit 150 compare each energy calculation stored in energy calculator 140 with a predetermined threshold. FIG. 7 illustrates threshold values for different probabilities of false alarms. The energy calculations that exceed the threshold are passed from threshold unit 150 to maximum detector 160. Maximum detector 160 selects the largest threshold crossing energy calculation provided by threshold units 150. The largest threshold crossing energy calculation is used to identify and detect the sequence represented by the input signals and to establish the frequency offset associated with the input signal. The expected sequence contained in the input signal is identified by the value of m that is associated with the output selected by maximum detector 160. The time delay associated with the input signal is determined by the value of n or the position in the search window associated with the output selected by maximum detector 160. Additionally, the frequency offset associated with the input signal is identified by the frequency bin (b×$f_A$) associated with the set of multipliers that were used to produce the output selected by maximum detector 160.

It should be noted that it is also possible to select the maximum output from energy calculations 140 and then compare that maximum output to the threshold. The maximum output that exceeds the threshold identifies and detects the sequence represented by the input signal, and determines the frequency offset associated with the input signal.

Derivation of Threshold
Consider the sequence at the transmitter $$s(k)=A_c p(k)c(k)v(k), k=0, 1, \ldots, 4095 \qquad \text{(Eq. 1)}$$

where $A_c$ is the chip amplitude at the transmitter, p(k) is the scrambling code, c(k) is the signature sequence, and v(k) is the modulation sequence.
The signal at the base station receiver is modeled as $$r(k)=s(k)h(k)+z(k) \qquad \text{(Eq. 2)}$$

where h(k) is the channel gain and $z(k)=z\_I(k)+j\ z\_Q(k)$ is complex white Gaussian noise with variance $\sigma^2$.
At the receiver, the following hypothesis testing is carried out for every time delay $$H_0 : r(k)=z(k)$$

$$H_1 : r(k)=s(k)h(k)+z(k). \qquad \text{(Eq. 3)}$$

Define the following symbols
 $N_c$: Coherent integration length in number of chips
 $N_{seg}$: Number of segments for noncoherent combining
 $N_{div}$: Number of diversity antennas
 I: Number of frequency offset candidates
 q: Threshold for detection
 $P_{FA}$: False alarm probability
For hypothesis $H_0$, the decision statistic formed by energy computation (or, squared L2 norm) for each frequency bin i has chi-squared distribution with $N=2\ N_{seg}\ N_{div}$ degrees of freedom. The underlying noise variance after coherent accumulation is $\sigma^2 N_c/2$. The cumulative distribution function (cdf) of the decision statistic for each frequency bin for hypothesis $H_0$ is given by $$F_Y(y|H_0) = 1 - e^{-y/(\sigma^2 N_c)} \sum_{k=0}^{N/2-1} \frac{1}{k!}\left(\frac{y}{\sigma^2 N_c}\right)^k. \qquad \text{(Eq. 4)}$$

The threshold for detection for I frequency bins is computed from the relation $$\begin{aligned} P_{FA} &= Pr[y_o > q \text{ or } y_1 > q \text{ or} \ldots \text{or } y_{I-1} > q] \qquad \text{(Eq. 5)} \\ &= 1 - Pr[y_o \leq q \text{ and } y_1 \leq q \text{ and} \ldots \text{and } y_{I-1} \leq q] \\ &= 1 - \prod_{i=0}^{I-1} F_{Y_i}(q) \\ &= 1 - F_Y^I(q). \end{aligned}$$

Using the relation (Eq. 4) and (Eq. 5), we can find the threshold by a recursive search. For a desired value of $P_{FA}$, we do a sequential search of threshold value q in steps of Δq. The following pseudo-code summarizes the recursion.
 q=0;
 $F_Y$(q)=0;
 Δq=Desired resolution for threshold search;
 do while {
  $((1-P_{FA})^{1/I} > F_Y(q))$
  q:=q+Δq;
  Update $F_Y$(q);
 }
FIG. 7 illustrates the difference in threshold values for various detection algorithms for UMTS access preamble detection. The threshold is compared for three detection algorithms, i.e., fully-coherent detection, 4 segment noncoherent detection, and the detection algorithm with frequency offset compensation. Squared L2 norm is used as the decision statistic. We assume that $N_{div}=2$. The signals from two antennas are noncoherently combined. For fully-coherent detection, $N_{seg}=1$, $N_c=4096$ and for 4 segment noncoherent detection, $N_{seg}=4$, $N_c=1024$. For coherent detection with frequency offset compensation, we have $N_{seg}=1$, $N_c=4096$ and I=5. The noise is normalized to $\sigma^2=1$.

The invention claimed is:

1. A method of detecting and identifying one of a plurality of known sequences in a received signal and a frequency offset associated with the received signal, comprising the steps of:

segmenting the received signal into at least a first and a second segment, each having at least two samples;

correlating each of the samples in the at least first and second segments with a representative sample to produce at least a first and a second set of sample correlation outputs;

producing at least a first and a second set of signal identity outputs, the first set of signal identity outputs indicating a degree of match between a first signal represented by the first set of sample correlation outputs and each of a plurality of expected signal identities, and the second set of signal identity outputs indicating a degree of match between a second signal represented by the second set of sample correlation outputs and each of the plurality of expected signal identities;

providing a plurality of frequency offset compensations to the at least first and second set of signal identity outputs to produce for each frequency offset compensation at least a first and second set of frequency offset compensated signal identity outputs, each frequency offset compensation corresponding to a different possible frequency offset that affected the received signal, for each frequency offset compensation a different frequency offset multiplication factor being applied to each of the at least the first and second set of signal identity outputs;

for each frequency offset compensation, coherently summing corresponding signal identity outputs from the at least the first and second set of frequency offset compensated signal identity outputs to form for each frequency offset compensation a plurality of summed signal identity outputs;

comparing to a threshold at least one summed signal identity output from the plurality of summed signal identity outputs formed for each frequency offset compensation to produce a set of threshold exceeding summed signal identity outputs; and selecting, based on magnitude, at least one threshold exceeding summed signal identity output to detect and identify the received signal and the frequency offset associated with the detected and identified received signal.

2. The method of claim 1, further comprising the step of deinterleaving at least one of the first and the second segment to form the at least two samples.

3. The method of claim 1, wherein the representative sample is the same for at least two samples.

4. The method of claim 1, wherein the threshold is the same for each summed signal identity output.

* * * * *